United States Patent
Martinez Bonastre et al.

(10) Patent No.: US 12,283,697 B2
(45) Date of Patent: Apr. 22, 2025

(54) CATALYST PREPARATION

(71) Applicant: JOHNSON MATTHEY HYDROGEN TECHNOLOGIES LIMITED, London (GB)

(72) Inventors: Alejandro Martinez Bonastre, Reading (GB); Geoffrey Spikes, Reading (GB)

(73) Assignee: Johnson Matthey Hydrogen Technologies Limited, London (GB)

(*) Notice: Subject to any disclaimer, the term of this patent is extended or adjusted under 35 U.S.C. 154(b) by 270 days.

(21) Appl. No.: 17/997,788

(22) PCT Filed: Jul. 6, 2021

(86) PCT No.: PCT/GB2021/051711
§ 371 (c)(1),
(2) Date: Nov. 2, 2022

(87) PCT Pub. No.: WO2022/008894
PCT Pub. Date: Jan. 13, 2022

(65) Prior Publication Data
US 2023/0223557 A1 Jul. 13, 2023

(30) Foreign Application Priority Data
Jul. 7, 2020 (GB) .................................. 2010406

(51) Int. Cl.
*H01M 4/92* (2006.01)
*H01M 4/88* (2006.01)

(52) U.S. Cl.
CPC ......... *H01M 4/926* (2013.01); *H01M 4/8807* (2013.01); *H01M 4/881* (2013.01); *H01M 4/8814* (2013.01); *H01M 4/8817* (2013.01); *H01M 4/8828* (2013.01); *H01M 4/8882* (2013.01)

(58) Field of Classification Search
None
See application file for complete search history.

(56) References Cited

U.S. PATENT DOCUMENTS

2012/0300364 A1  11/2012  Cai et al.
2018/0050915 A1* 2/2018  Ding ................. B01J 20/28019
2019/0036128 A1* 1/2019  Martinez Bonastre .....................
                                                              H01M 4/8892

FOREIGN PATENT DOCUMENTS

| GB | 2394597 A | 4/2004 |
| KR | 2004 0063010 A | 7/2004 |
| KR | 2017 0093001 A | 8/2017 |
| WO | 2009/149540 A1 | 12/2009 |
| WO | 2015/040186 A1 | 3/2015 |

(Continued)

*Primary Examiner* — Jonathan Crepeau
(74) *Attorney, Agent, or Firm* — BakerHostetler

(57) ABSTRACT

The present invention provides a method of preparing a catalyst material, said catalyst material comprising a support material and an electrocatalyst dispersed on the support material: said method comprising the steps: i) providing a support material; then ii) 10 depositing a silicon oxide precursor on the support material; then iii) carrying out a heat treatment step to convert the silicon oxide precursor to silicon oxide; then iv) depositing said electrocatalyst or a precursor of said electrocatalyst on the support material; then v) removal of at least some of the silicon oxide.

12 Claims, 2 Drawing Sheets

Cell Voltage at 30% RH, 80 °C, 50 kPa-gauge-inlet

(56) References Cited

FOREIGN PATENT DOCUMENTS

WO      2016/141559 A1    9/2016
WO      2017/129982 A1    8/2017

* cited by examiner

Cell Voltage at 30% RH, 80 °C, 50 kPa-gauge-inlet

Humidity sweep, 100 kPa-gauge-inlet, Cell voltage at 1000 mA/cm2

O$_2$ concentration sweep, 100% RH, 80 °C, 100 kPa-gauge-inlet

CATALYST PREPARATION

FIELD OF THE INVENTION

The present invention relates to a method of preparing a catalyst material which includes a step of adding silicon oxide to a support material prior to deposition of an electrocatalyst.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly, which is essentially composed of five layers. The central layer is the polymer ion-conducting membrane. On either face of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers also generally comprise a proton conducting material, such as a proton conducting polymer, to aid transfer of protons from the anode electrocatalyst to the ion-conducting membrane and/or from the ion-conducting membrane to the cathode electrocatalyst.

Conventionally, the membrane electrode assembly can be constructed by a number of methods. Typically, the methods involve the application of one or both of the electrocatalyst layers to an ion-conducting membrane to form a catalyst coated ion-conducting membrane. Subsequently, a gas diffusion layer is applied to the electrocatalyst layer. Alternatively, an electrocatalyst layer is applied to a gas diffusion layer to form a gas diffusion electrode, which is then combined with the ion-conducting membrane. A membrane electrode assembly can be prepared by a combination of these methods e.g. one electrocatalyst layer is applied to the ion-conducting membrane to form a catalyst coated ion-conducting membrane, and the other electrocatalyst layer is applied as a gas diffusion electrode. The electrocatalyst layers are applied using an electrocatalyst ink which conventionally comprises an electrocatalyst material, an ion-conducting polymer, solvents and/or diluents, and any agents desired to be included in the electrocatalyst layer.

The electrocatalyst layers generally comprise an electrocatalyst material comprising a metal or metal alloy suitable for the fuel oxidation or oxygen reduction reaction, depending on whether the layer is to be used at the anode or cathode. Electrocatalysts for fuel oxidation and oxygen reduction are typically based on platinum or platinum alloyed with one or more other metals. The platinum or platinum alloy electrocatalyst can be in the form of unsupported nanometre sized particles (for example metal blacks) or can be deposited as discrete very high surface area nanoparticles onto an electrically conducting support material (a supported electrocatalyst), such as a high surface area carbon material.

Suitable carbons typically include those from the carbon black family, such as oil furnace blacks, extra-conductive blacks, acetylene blacks and graphitised versions thereof. Exemplary carbons include Akzo Nobel Ketjen® EC300J and Cabot Vulcan® XC72R. Additionally, carbons specifically designed for fuel cell applications such as those described in WO2013/012894 may be used. Alternative materials used as electrically conductive supports include metal oxides or mixed oxides, in particular conductive mixed oxides such as niobia-doped titania, phosphorus-doped tin oxide and mixed platinum group metal oxides or mixed metal oxides as disclosed in WO2012/080726.

The method of depositing the electrocatalyst on the support material can affect the electrochemical performance of the supported electrocatalyst. Moreover, it is important that the method for depositing the electrocatalyst on the support material is efficient and has low impact on the environment.

SUMMARY OF THE INVENTION

Accordingly, in a first aspect the present invention provides a method of preparing a catalyst material, said catalyst material comprising a support material and an electrocatalyst dispersed on the support material; said method comprising the steps:
  i) providing a support material; then
  ii) depositing a silicon oxide precursor on the support material; then
  iii) carrying out a heat treatment step to convert the silicon oxide precursor to silicon oxide; then
  iv) depositing said electrocatalyst or a precursor of said electrocatalyst on the support material; then
  v) removal of at least some of the silicon oxide.

For avoidance of doubt, steps i), ii), iii), iv) and v) must be carried out in the recited order i), ii), iii), iv) then v).

Surprisingly, the inventors found that catalysts materials prepared by this method provide better performing membrane electrode assemblies than analogous catalyst materials prepared by conventional methods which do not include the addition of silicon oxide prior to deposition of the electrocatalyst, followed by removal of at least some of the silicon oxide.

The present invention also provides, in a second aspect, a catalyst material obtainable by the method of the invention In a third aspect, the present invention provides an electrocatalyst layer comprising a catalyst material according to the second aspect of the invention and an ion-conducting polymer wherein the weight ratio of ion-conducting polymer to support material is in the range of and including 1:3 to 6:5. It is surprising and advantageous that catalyst materials of the present invention can be used in electrocatalyst layers with a reduced amount of ion-conducting polymer as compared to conventional electrocatalyst layers, whilst maintaining a desired level of electrochemical activity. Reducing the amount of ion-conducting polymer can increase the performance of the electrocatalyst layer in a membrane electrode assembly because it can result in higher porosity and higher rates of gas and water transport in the electrocatalyst later.

DETAILED DESCRIPTION OF THE INVENTION

Figure 1:
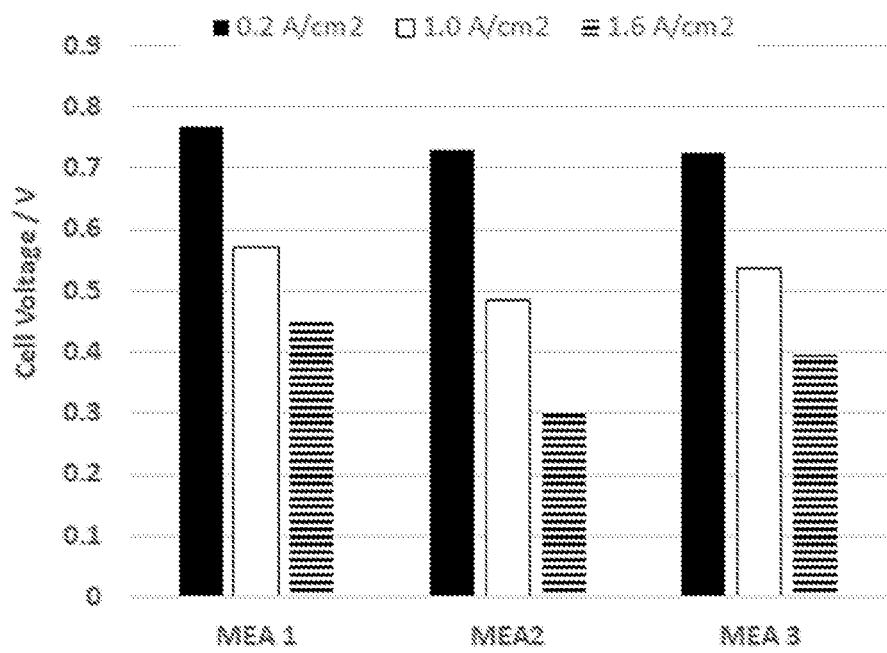
FIG. 1 is a bar chart showing the voltage at 0.2, 1.0 and 1.6 A/cm$^2$ at low humidity for a membrane electrode assembly containing a cathode electrocatalyst layer comprising a catalyst material prepared by the method of the invention, and membrane electrode assemblies containing cathode electrocatalyst layers comprising comparative catalyst materials.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The support material provided in step i) is preferably an electrically conductive carbon support material which is preferably in powder form. The support material does not comprise an electrocatalyst. The carbon support material may be, for example, a carbon black or a graphitised carbon black, such as a commercially available carbon black e.g. from Cabot Corp. (Vulcan® XC72R)) or Akzo Nobel (the Ketjen® black series) or a graphitised version of these carbon blacks or other commercially available carbon blacks such as acetylene blacks (e.g. those available from Chevron Phillips (Shawinigan Black®) or Denka®). The carbon support material may also be one specifically designed for use in a fuel cell, such as those described in WO2013/045894. The support material is not limited to carbon support materials and may be any porous support material suitable for supporting an electrocatalyst. Accordingly, the support material may be a metal oxide or a mixed oxide, in particular a conductive mixed oxide such as niobia-doped titania, phosphorus-doped tin oxide and mixed platinum group metal oxides or mixed metal oxides as disclosed in WO2012/080726, a carbide (e.g. tungsten carbide, molybdenum carbide or titanium carbide, suitably tungsten carbide or titanium carbide), or a nitride, in particular a conductive nitride (e.g. titanium nitride or titanium aluminium nitride).

The catalyst material prepared by the method of the invention comprises an electrocatalyst dispersed on a support material. Accordingly, the catalyst material is a supported electrocatalyst and the term "supported" will be readily understood by a skilled person. For example, it will be understood that the term "supported" includes the electrocatalyst being bound or fixed to the support material by physical or chemical bonds. For instance, the electrocatalyst may be bound or fixed to the support material by way of ionic or covalent bonds, or non-specific interactions such as van der Waals forces. The catalyst material comprises the support material and the electrocatalyst, preferably consists essentially of the support material and the electrocatalyst, more preferably consists of the support material and the electrocatalyst.

The electrocatalyst is preferably suitable for use in a fuel cell or electrolyser, more preferably a proton exchange membrane fuel cell or electrolyser. Accordingly, the catalyst material is preferably a fuel cell or electrolyser catalyst material, more preferably a proton exchange membrane fuel cell or electrolyser catalyst material. The catalyst material may accordingly be a proton exchange membrane fuel cell anode or cathode catalyst material. Accordingly, the electrocatalyst is suitably selected from:

(i) the platinum group metals (platinum, palladium, rhodium, ruthenium, iridium and osmium);
(ii) gold or silver;
(iii) a base metal;
or an alloy or mixture comprising one or more of these metals or their oxides. A base metal is tin or a transition metal which is not a noble metal. A noble metal is a platinum group metal (platinum, palladium, rhodium, ruthenium, iridium or osmium) or gold. Preferred base metals are copper, cobalt, nickel, zinc, iron, titanium, molybdenum, vanadium, manganese, niobium, tantalum, chromium and tin. Preferably the electrocatalyst is not an alloy i.e. preferably the electrocatalyst is a reduced single metal electrocatalyst selected from the platinum group metals (platinum, palladium, rhodium, ruthenium, iridium and osmium), preferably platinum. In the case that the electrocatalyst is an alloy, the electrocatalyst is preferably an alloy, preferably binary, of a platinum group metal, preferably platinum, preferably with a base metal, preferred base metals as defined above, more preferably nickel or cobalt, most preferably nickel. The atomic ratio of platinum group metal, preferably platinum, to alloying metal is typically in the range of and including 3:1 to 1:3.

The silicon oxide precursor is any compound which is able to be converted to silicon oxide during a heat treatment step. The silicon oxide precursor may be a siloxane compound, i.e. a compound having a Si—O—Si linkage. The siloxane may be formed by reaction of one or more alkoxysilanes (such as (3-aminopropyl)triethoxysilane (APTES), 3-aminopropyl(diethoxy)methylsilane (APDMES), tetraethylorthosilicate (TEOS) or methyltriethylorthosilicate (MTEOS)). Alternatively, the siloxane compound is formed from a silazane, chlorosilane or dimethylaminosilane. The heat treatment step enables the conversion of the silicon oxide precursor to silicon oxide. The heat treatment step is suitably carried out in a reductive atmosphere, for example under hydrogen, or a mixture of hydrogen and an inert gas. Alternatively, the reductive atmosphere can be provided by a carbothermal reduction. Preferably, the heat treatment step is carried out under a mixture of hydrogen and an inert gas. The heat treatment step is suitably carried out at a temperature in the range of and including 250° C. to 500° C., preferably 290° C. to 400° C. Preferably, the heat treatment step is carried out as a single step of heat treatment i.e. it is not performed in more than one stage, it is performed in a single stage of heating at the required temperature (including ramping up to the required temperature from room temperature, for example 1 to 5° C./min) with no intermediate stages, such as cooling stages. The silicon oxide present after step iii) is preferably present in an amount of no more than 20 wt % with respect to the weight of the support material, preferably 15 wt %, more preferably 12 wt %. The silicon oxide present after step iii) is preferably present in an amount of at least 2 wt % with respect to the weight of the support material, more preferably at least 4 wt %.

The electrocatalyst may be deposited in step iv) by any method known to a skilled person for depositing an electrocatalyst on a support material, providing it is compatible with the silicon oxide applied in step iii) i.e. it does not expose the material produced in step iii) to conditions which remove silicon oxide, e.g. it is not basic enough to dissolve the silicon oxide. For example, a method as described in WO2005/123255 using a metal oxide sol and a reduction step may be used. Alternatively, a method using an aqueous solution of a metal acid or salt and a reduction step as described in WO2013/045894 may be used. An alloy electrocatalyst can be deposited using any method familiar to a skilled person, such as the method disclosed in WO2014/184546 or WO2017/203257. For avoidance of doubt, the phrase "depositing said electrocatalyst or a precursor of said electrocatalyst on the support material" in step iv) means depositing on the silicon oxide coated support material prepared in step iii). Preferably, all (e.g. 100%) of the electrocatalyst which the catalyst material comprises is deposited in step iv) prior to step v). In which case, step v) gives the catalyst material. The alternative in which a precursor of said electrocatalyst is deposited in step iv) preferably applies to the aspect in which the electrocatalyst is an alloy electrocatalyst. In this alternative, the method comprises an additional step vi) after step v) of forming the electrocatalyst to give the catalyst material. The precursor may suitably be, for example, a constituent metal of an alloy electrocatalyst. In which case, step vi) comprises depositing the remaining metal(s) and forming the alloy to give the catalyst material, for example in accordance with the method disclosed in WO2014/184546 or WO2017/203257.

It is preferred that essentially all of the silicon oxide is removed in step v), although small amounts of silicon oxide are not detrimental. Thus, step (v) removes most, preferably essentially all, of the silicon oxide from the support material. The silicon oxide may be removed using a fluorination or hydrolysation process, preferably using a basic solution, such as a hydroxide solution, and in particular tetraethylammonium hydroxide. Up to and including 5 wt % with respect to the weight of the support material, suitably up to and including 4 wt %, more suitably up to and including 2 wt % and even more suitably up to and including 1 wt % of silicon oxide can remain on the catalyst material after removal. Removing essentially all of the silicon oxide means that silicon oxide may be removed with ≥0 wt % but less than 1 wt % with respect to the weight of the support material of silicon oxide, suitably less than 0.5 wt %, preferably less than 0.01 wt % remaining on the catalyst material.

The electrocatalyst loading in the catalyst material may be expressed in terms of weight percent active metal, e.g. platinum group metal, with respect to the total weight of the catalyst material which can be determined using inductively coupled plasma mass spectrometry (ICPMS). The loading may suitably be at least 10 wt % active metal, e.g. platinum group metal. The loading of the electrocatalyst may suitably be no more than 90 wt % active metal, e.g. platinum group metal, typically no more than 60 wt % active metal, e.g. platinum group metal, for example no more than 50 wt % active metal, e.g. platinum group metal by total weight of the catalyst material. This is controlled in the method of the invention by controlling the weight ratio of active metal, e.g. platinum group metal, to support material in step iv) of the method.

The electrocatalyst layer of the invention comprises an ion-conducting polymer, such as a proton conducting polymer. Accordingly, the ion-conducting polymer may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.) and perfluorosulphonic acid ionomer material supplied by 3M®), or ionomers based on partially fluorinated or non-fluorinated hydrocarbons that are sulphonated or phosphonated polymers, such as those available from FuMA-Tech GmbH as the Fumapem® P, E or K series of products, or from JSR Corporation, Toyobo Corporation, and others. Suitably, the ionomer is a perfluorosulphonic acid, in particular the Nation® range available from Chemours company, especially Nafion® 1100EW, the Aquivion® range available from Solvay, especially Solvay® 830EW, and 3M 825EW perfluorosulphonic acid ionomer. It is surprising and advantageous that catalyst materials of the present invention can be used in electrocatalyst layers with a reduced amount of ion-conducting polymer as compared to conventional electrocatalyst layers, whilst maintaining or indeed improving electrochemical activity. Reducing the amount of ion-conducting polymer can increase the performance of the electrocatalyst layer in a membrane electrode assembly because it results in higher porosity in the electrocatalyst layer and higher rates of gas and water transport. Accordingly, it is preferred that the weight ratio of ion-conducting polymer to support material is in the range of and including 1:3 to 6:5, preferably 1:1 to 4:5, alternatively preferably 1:2 to 4:5, more preferably 2:3 to 4:5.

The electrocatalyst loading in the electrocatalyst layers will depend on the intended use. In this context, electrocatalyst loading means the amount of active metal, for example platinum group metal, in the electrocatalyst layer expressed as $mg/cm^2$. For example, in a fuel cell cathode the loading is typically at least 0.05 $mg/cm^2$ and no more than 1.0 $mg/cm^2$. In a fuel cell anode, the loading is typically at least 0.02 $mg/cm^2$ and no more than 1.0 $mg/cm^2$. When the electrocatalyst is an alloy of platinum, e.g. in a fuel cell cathode, the electrocatalyst loading is the amount of platinum per unit area expressed as $mgPt/cm^2$. For example, in a fuel cell cathode containing an electrocatalyst which contains platinum, the electrocatalyst loading is suitably at least 0.05 $mgPt/cm^2$, typically no more than 1.0 $mgPt/cm^2$, suitably no more than 0.75 $mgPt/cm^2$, for example no more than 0.5 $mgPt/cm^2$, or no more than 0.3 $mgPt/cm^2$. In a fuel cell anode, the electrocatalyst loading is suitably at least 0.02 $mgPt/cm^2$, typically no more than 1.0 $mgPt/cm^2$, suitably no more than 0.75 $mgPt/cm^2$, for example no more than 0.5 $mgPt/cm^2$ or no more than 0.2 $mg/Ptcm^2$.

The electrocatalyst layer may comprise additional components. For example, a proton exchange membrane fuel cell electrocatalyst layer of the invention may comprise an oxygen evolution reaction catalyst along with the hydrogen oxidation (anode) or oxygen reduction reaction (cathode) electrocatalyst. Such additional components may also include, but are not limited to: a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components is within the capability of a skilled person to determine depending on the application of the electrocatalyst layer.

To prepare the electrocatalyst layer, the catalyst material of the invention and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve a suitable particle size distribution. After preparation of the catalyst ink, the ink is deposited onto a substrate (e.g. gas diffusion layer, ion-conducting membrane or a carrier/transfer substrate) to form the electrocatalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The electrocatalyst layer may be deposited onto a gas diffusion layer to form a gas diffusion electrode of the invention. The gas diffusion layer comprises a gas diffusion substrate and, preferably, a microporous layer. When a microporous layer is present, the electrocatalyst layer is deposited onto the microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the softening point of the polymer. Typical microporous layers comprise a mixture of a carbon black and a polymer such as polytetrafluoroethylene (PTFE).

In the catalyst coated ion-conducting membrane of the invention, the electrocatalyst layer is deposited onto an ion-conducting membrane, either by direct coating of a catalyst ink onto the membrane, or indirectly by transfer from a decal transfer substrate, to form a catalyst coated ion-conducting membrane. The catalyst coated ion-conducting membrane of the invention may comprise a second electrocatalyst layer on its opposite face, which may be in accordance with the invention or otherwise. The ion-conducting membrane may suitably be any membrane suitable for use in a proton exchange membrane fuel cell, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.) and perfluorosulphonic acid ionomer material supplied by 3MR. Alternatively, the membrane may be based on a sulphonated hydrocarbon membrane such as those available from FuMA-Tech GmbH as the Fumapem® P, E or K series of products, or from JSR Corporation, Toyobo Corporation, and others.

The thickness of the ion-conducting membrane is not particularly limited and will depend on the intended application of the ion-conducting membrane. For example, typical fuel cell ion-conducting membranes have a thickness of at least 5 μm, suitably at least 8 μm, preferably at least 10 μm. Typical fuel cell ion-conducting membranes have a thickness of no more than 50 μm, suitably no more than 30 μm, preferably no more than 20 μm. Accordingly, typical fuel cell ion-conducting membranes have a thickness in the range of and including 5 to 50 μm, suitably 8 to 30 μm, preferably 10 to 20 μm.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer. The choice of additional components is within the capability of a skilled person to determine depending on the application of the electrocatalyst layer.

Any reinforcement present may extend across the entire thickness of the ion-conducting membrane or may extend across only a part of the thickness of the ion-conducting membrane. It will be understood that the thickness of the ion-conducting membrane extends perpendicular to the face of the ion-conducting membrane, e.g. it is in the through plane z-direction. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

When the electrocatalyst layer is created on a decal transfer substrate, by coating of a catalyst ink onto the decal transfer substrate, it forms a catalysed decal transfer substrate of the invention. Additional layers may be deposited on the exposed face of the electrocatalyst layer prior to removal of the decal transfer substrate; for example, an ion-conducting ionomer layer may be applied from a dispersion of ionomer using any suitable deposition technique known as described above in relation to deposition of the electrocatalyst layer. Further additional layers can be added as required, for example as described in PCT Patent Application No. GB2015/050864. The decal transfer substrate is removed from the electrocatalyst layer at an appropriate time. The decal transfer substrate may be formed from any suitable material from which the electrocatalyst layer can be removed without damage. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

As a skilled person will understand, the membrane electrode assembly of the invention can be constructed by a number of methods, providing it contains at least one electrocatalyst layer of the invention. For example, the membrane electrode assembly may comprise a catalyst coated ion-conducting membrane of the invention which comprises two electrocatalyst layers at least one of which is an electrocatalyst layer of the invention, with a gas diffusion layer applied to each electrocatalyst layer. Alternatively, the membrane electrode assembly may comprise an ion-conducting membrane sandwiched between two gas diffusion electrodes, at least one of which is a gas diffusion electrode of the invention. The membrane electrode assembly may also comprise a catalyst coated ion-conducting membrane with one electrocatalyst layer, and on the opposite face of the ion-conducting membrane a gas diffusion electrode in which either or both of the electrocatalyst layer and the gas diffusion electrode are of the invention.

EXAMPLES

Preparation of Catalyst Materials

A catalyst material consisting of 50 wt % Pt/C was prepared by the following method according to the invention. 10 g of carbon black was slurried in 1 L of demineralised water and 150 ml of 35% ammonia solution was added with stirring. The mixture was heated to 60° C. before the addition of 7.64 g of tetraethylorthosilicate (TEOS). The mixture was stirred for 2 h before being allowed to cool to ambient temperature and then filtered and washed with demineralised water. The resultant solid was dried overnight at 105° C. and then ramped to to 350° C. at a 2° C./min ramp rate under 5% $H_2/N_2$ and held for 3 h, to convert the $SiO_2$ precursor to $SiO_2$. After cooling to ambient, the fired, $SiO_2$ coated, carbon intermediate was then dispersed in 1 L of demineralised water and 10 g of Pt was added according to the procedure disclosed in WO2005/123255. The sample was collected by filtration and washed with demineralised water before being re-dispersed in 1 L of demineralised water. 210 ml of a 35 w % tetraethylammonium hydroxide solution was added with stirring and the mixture stirred overnight at ambient temperature. The product was then collected by filtration and washing with demineralised water before drying at 105° C. overnight.

The comparative catalyst material used was a 50% Pt/C in which the carbon support is a carbon specifically designed for use in a fuel cell as described in WO2013/045894 and which was prepared by a conventional deposition process without the use of silicon oxide.

Preparation of Membrane Electrode Assemblies

The catalyst material prepared by the method of the invention and the comparative catalyst material were used in cathode electrocatalyst layers. Cathode electrocatalyst layer inks (cathode inks) were prepared by wetting the catalyst material with a PFSA ionomer (Nafion® 1100 EW) dispersed in a 20% water/80% propan-1-ol mix. This mixture was mechanically agitated using an overhead stirrer until all of the catalyst material had been wetted and dispersed in the liquid. The ink was then processed by ball milling to form a well dispersed ink. Three such inks were prepared:

EL1: containing a catalyst prepared according to the invention and 70% ionomer by weight of the support material.

EL2: containing the comparative catalyst material and 70% ionomer by weight of the support material.

EL3: containing the comparative catalyst material and 90% ionomer by weight of the support material.

Anode electrocatalyst layer ink (anode ink) was prepared by wetting an anode catalyst material with a PFSA ionomer (Nafion® 1100 EW) dispersed in an 83% water/17% propan-1-ol mix. The anode electrocatalyst material was 20% Pt/XC72R. This mixture was mechanically agitated using an overhead stirrer until all of the catalyst had been wetted and dispersed in the liquid. The ink was then processed through an Eiger ball mill to form a well dispersed ink.

Catalyst coated ion-conducting membranes of 50 cm$^2$ active area were prepared by depositing the anode ink and cathode inks EL1, EL2 and EL3 onto PTFE sheets to form electrocatalyst layers and transferring the appropriate layers to either side of PFSA reinforced membranes (20 μm thickness) at temperatures of between 150° C. to 200° C. The cathode electrocatalyst catalyst loading was 0.2 mgPt/cm$^2$ and the anode electrocatalyst loading was 0.1 mgPt/cm$^2$.

A gas diffusion layer was applied to each face of each catalyst coated ion-conducting membrane to form the complete membrane electrode assemblies MEA1, MEA2 and MEA3. The gas diffusion layer used was a carbon fibre paper with a hydrophobic microporous layer containing carbon and PTFE applied to the face in contact with the catalyst coated ion-conducting membrane. MEA1 comprised a cathode electrocatalyst layer formed from EL1, MEA2 comprised a cathode electrocatalyst layer formed from EL2, MEA3 comprised a cathode electrocatalyst layer formed from EL3.

Membrane Electrode Assembly Performance Testing

Pure oxygen, air or synthetic air were used as cathode reactants and pure $H_2$ as the anode reactant (all gases of 99.9% purity).

Stoichiometric flow rates of anode (s=2 for $H_2$) and cathode (s=9.5 for $O_2$ and s=2 for air) reactants were used at current densities >0.2 A cm$^{-2}$ and constant flows (corresponding to 0.2 A cm$^{-2}$ stoichiometric flows) at current densities <0.2 A cm$^{-2}$. Reactant humidification was achieved by bubbling the gases through water reservoirs, the temperatures of which were calibrated to yield the desired relative humidity (RH) values. Humidity and cell pressure were measured at the inlet for both electrodes. Cell resistances as a function of current density (i.e., the sum of the proton-conduction resistance in the membrane and the various electronic resistances, bulk and contact resistances) were determined using an AC perturbation of 1 kHz. For each current density value, the cell voltage was allowed stabilized for 10 min before the voltage was recorded. Multiple-path serpentine flow-field plates (two and three parallel channels for the anode and cathode, respectively) made from machined, sealed graphite blocks were used for testing.

The MEAs were conditioned by the application of a constant current density of 500 mAcm$^{-2}$ under $H_2$/Air at 100 kPa gauge, 100% RH and 80° C. The cell voltage was monitored until a stable value was observed. The conditioning step lasted 2 hours unless specified otherwise. Afterwards, the cathode catalyst layer was exposed to a series of cathode starvation steps followed by a 2 hour hold at 500 mAcm$^{-2}$ until a stable voltage was observed. The cathode starvation step (purging of cathode compartment with pure nitrogen) reduced the cathode voltage to below 0.1V and it is intended to provide an electrochemical cleaning step for the cathode catalyst before measuring its activity under $H_2/O_2$. Polarisation curves in 50 cm$^2$ single cells were performed in $H_2/(O_2$ and Air) at 100 kPa gauge inlet pressure, 80° C. and using a relative humidity at the cell inlet of 100% RH or 30% RH. The cell current density was held for 10 min at each point and the cell voltage was averaged over the last minute of this hold. The cell voltage under $H_2$/Air shown in the figures was recorded in the descending voltage direction, from low currents to high currents. The polarisation curves under $H_2/(O_2$, Air) were not corrected for internal (ohmic) resistance.

Temperature sweeps were performed in 50 cm$^2$ single cells under $H_2$/Air. The anode and cathode stoichiometries were set at 2 and the anode and cathode pressures were controlled at 100 kPa gauge at the cell inlet. The anode and cathode humidifier dew points were controlled at 53° C. whilst the cell temperature was varied from 35 to 90° C. This has the effect of very high humidities at low temperatures and very low humidities at high temperatures. The temperature sweeps were recorded from low to high temperature at the specified 53° C. Dew point and the cell voltage was not corrected for internal resistance. The current density was held at 1000 mA/cm$^2$ for 10 minutes at each temperature and the voltage was averaged from the data recorded during the last minute of the hold.

Oxygen concentration sweeps were performed in 50 cm$^2$ single cells. The current density was fixed at 1000 mA/cm$^2$ whilst the oxygen concentration was changed from 100% $O_2$ to 75, 50, 30, 21 and 10% using $N_2$ as the dilution gas. The cell humidity was controlled at 100% RH and cell temperature maintained at 80° C. The anode and cathode stoichiometry were set at 2 and 10 respectively. The current density was held for 10 minutes at each oxygen concentration and the voltage was averaged from the data recorded during the last minute of the hold. The oxygen concentration sweeps were not corrected for internal resistance.

Experimental Results

FIG. 1 compares the performance at 0.2, 1.0 and 1.6 A/cm$^2$ of MEA 1 with MEA 2 and MEA 3 under hot, dry conditions (80° C. and 30% RH at 50 kPa-gauge-inlet). It can be seen that at all current densities MEA 1 using the catalyst material prepared by the method of the invention performs significantly better than MEA 2, the equivalent MEA using catalyst material prepared by a conventional method. A conventional way to improve performance under hot dry conditions it to add a higher percentage of ionomer to the cathode catalyst layer. This has been done for MEA 3 that contains the comparative catalyst material on the cathode side. The performance was increased compared to MEA 2, as expected, but was still lower than MEA 1 at all current densities. This demonstrates that the process of the invention allows the use of less ionomer whilst simultaneously achieving better performance across the range of current densities than MEAs made with comparative catalyst material.

Figure 2:
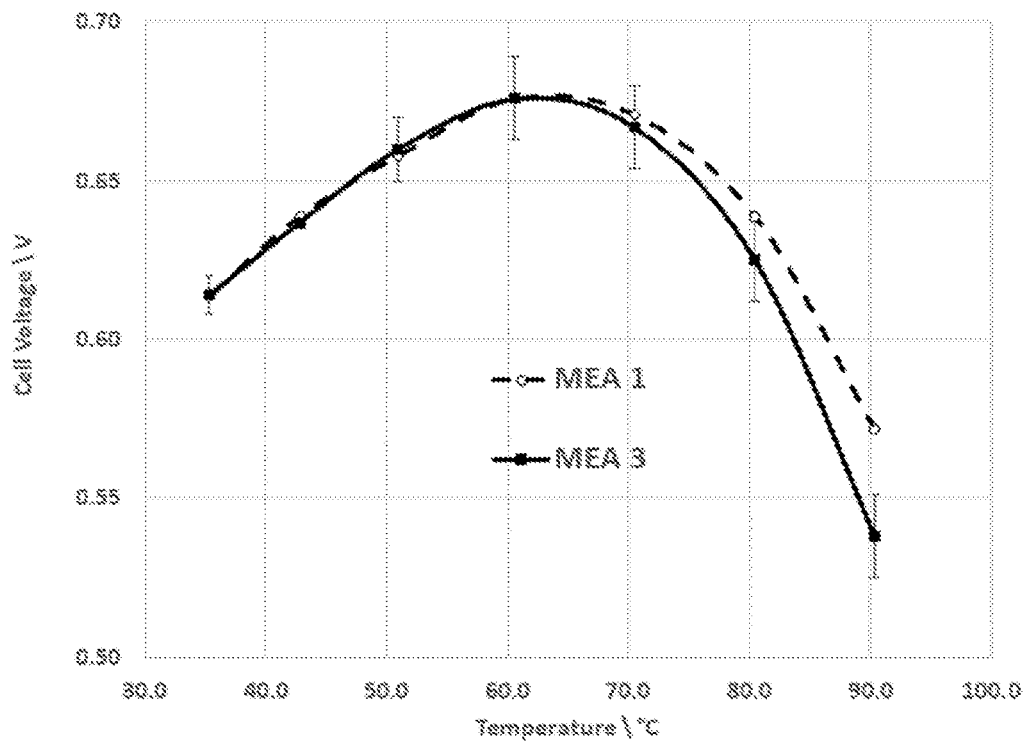
FIG. 2 is a temperature sweep plot at 1.0 A/cm$^2$ for a membrane electrode assembly containing a cathode electrocatalyst layer comprising a catalyst material prepared by the method of the invention and a membrane electrode assembly containing a cathode electrocatalyst layer comprising a comparative catalyst material.

FIG. 2 shows that, at a medium level current density of 1.0 A/cm$^2$, MEA 1 containing a cathode electrocatalyst layer which comprises catalyst material prepared by the method of the invention has better performance (the voltage is higher) than an MEA containing an electrocatalyst layer which comprises a conventional catalyst material i.e. MEA 3 over a range of hot, dry conditions (65 to 90° C. at a dew point of 53° C.). It is particularly surprising that MEA 1, in which the cathode electrocatalyst layer contains only 70 wt % ionomer with respect to the carbon support material performs better than MEA 3 in which the cathode electrocatalyst layer contains 90 wt % ionomer with respect to the carbon support material. Normally, it is expected that MEAs with higher ionomer levels within the cathode perform better under hot, dry conditions. Accordingly, with catalyst materials prepared by the process of the invention, less ionomer can be used which means higher porosity in the electrocatalyst layer and higher rates of gas and water transport.

Figure 3:
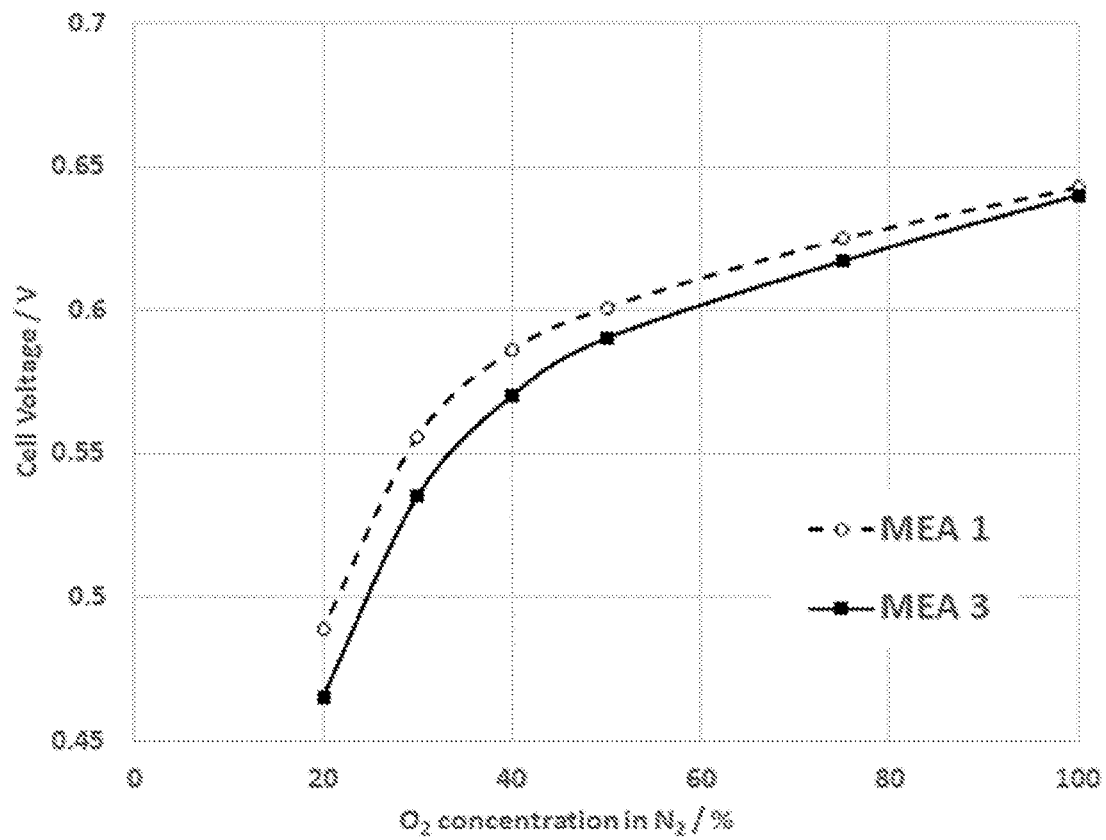
FIG. 3 is an oxygen concentration sweep plot at high humidity for a membrane electrode assembly containing a cathode electrocatalyst layer comprising a catalyst material prepared by the method of the invention, and a membrane electrode assembly containing a cathode electrocatalyst layer comprising a comparative catalyst material.

As shown in FIG. 3, under lower oxygen concentrations (i.e. closer to real-world operating conditions) MEA 1 performs better than MEA 3. This demonstrates the benefit in electrochemical performance associated with using the method of the invention to prepare a catalyst material.

The invention claimed is:

1. A method of preparing a catalyst material, said catalyst material comprising a support material and an electrocatalyst dispersed on the support material; said method comprising the steps:
   i) providing a support material that does not comprise an electrocatalyst; then
   ii) depositing a silicon oxide precursor on the support material; then
   iii) carrying out a heat treatment step to convert the silicon oxide precursor to silicon oxide; then
   iv) depositing said electrocatalyst or a precursor of said electrocatalyst on the support material; then
   v) removing at least some of the silicon oxide,
   wherein said support material is an electrically conductive carbon support material that is in powder form, and wherein the electrically conductive carbon is carbon black or graphitised carbon black.

2. A method according to claim 1, wherein essentially all of the silicon oxide is removed in step v).

3. A method according to claim 1, wherein the heat treatment step is carried out at a temperature in the range of and including 250° C. to 500° C.

4. A method according to claim 1, wherein the electrocatalyst is a reduced single metal electrocatalyst.

5. A method of preparing an electrocatalyst layer comprising a catalyst material and an ion-conducting polymer,
   said catalyst material comprising a support material and an electrocatalyst dispersed on the support material;
   wherein the weight ratio of ion-conducting polymer to support material is in the range of and including 1:3 to 6:5
   said method comprising the steps:
   i) providing a support material that does not comprise an electrocatalyst; then
   ii) depositing a silicon oxide precursor on the support material; then
   iii) carrying out a heat treatment step to convert the silicon oxide precursor to silicon oxide, then
   iv) depositing said electrocatalyst or a precursor of said electrocatalyst on the support material; then
   v) removing at least some of the silicon oxide, thereby yielding the catalyst material; then
   vi) dispersing the catalyst material and an ion-conducting polymer in an aqueous and/or organic solvent to prepare a catalyst ink; then
   vii) depositing the catalyst ink onto a substrate to form the electrocatalyst layer,
   wherein said support material is an electrically conductive carbon support material that is in powder form, and wherein the electrically conductive carbon is carbon black or graphitised carbon black.

6. The method of claim 5, wherein the substrate is an ion-conducting membrane.

7. The method of claim 5, wherein the substrate is a decal transfer substrate.

8. The method of claim 5, wherein the substrate is a gas diffusion layer.

9. The method of claim 4, wherein the reduced single metal electrocatalyst is selected from the group consisting of platinum group metals.

10. The method of claim 5, wherein the electrocatalyst is a reduced single metal electrocatalyst selected from the group consisting of platinum group metals.

11. The method of claim 1, wherein the electrocatalyst is an alloy of a platinum group metal.

12. The method of claim 5, wherein the electrocatalyst is an alloy of a platinum group metal.

* * * * *